United States Patent
Schneider

(10) Patent No.: US 9,959,312 B2
(45) Date of Patent: May 1, 2018

(54) HIGH PERFORMANCE INDEX CREATION ON SORTED DATA USING PARALLEL QUERY PLANS

(71) Applicant: Peter Schneider, Dublin, CA (US)

(72) Inventor: Peter Schneider, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 419 days.

(21) Appl. No.: 14/019,392

(22) Filed: Sep. 5, 2013

(65) Prior Publication Data

US 2015/0066900 A1    Mar. 5, 2015

(51) Int. Cl.
*G06F 17/30* (2006.01)

(52) U.S. Cl.
CPC .. *G06F 17/30445* (2013.01); *G06F 17/30336* (2013.01); *G06F 17/30463* (2013.01)

(58) Field of Classification Search
CPC ......... G06F 17/30463; G06F 17/30433; G06F 17/30474
USPC ......................... 707/718, 741, 736
See application file for complete search history.

(56) References Cited

U.S. PATENT DOCUMENTS

| | | | |
|---|---|---|---|
| 5,668,987 A | 9/1997 | Schneider | |
| 5,907,837 A | 5/1999 | Ferrel et al. | |
| 6,006,230 A | 12/1999 | Ludwig et al. | |
| 6,349,310 B1 | 2/2002 | Klein et al. | |
| 6,438,562 B1* | 8/2002 | Gupta | G06F 17/30336 707/696 |
| 6,920,460 B1 | 7/2005 | Srinivasan et al. | |
| 7,487,138 B2 | 2/2009 | Borthakur et al. | |
| 7,627,616 B2 | 12/2009 | Hershkovich et al. | |
| 8,126,870 B2 | 2/2012 | Chowdhuri et al. | |
| 8,126,909 B2 | 2/2012 | Pike et al. | |
| 8,515,945 B2* | 8/2013 | Pendap | G06F 17/30486 707/713 |
| 2003/0208503 A1 | 11/2003 | Roccaforte | |
| 2004/0199530 A1* | 10/2004 | Avadhanam | G06F 17/30327 |
| 2006/0080285 A1 | 4/2006 | Chowdhuri | |
| 2011/0154359 A1 | 6/2011 | Toub et al. | |
| 2012/0096054 A1* | 4/2012 | Egan | G06F 17/30902 707/812 |
| 2013/0159285 A1 | 6/2013 | Dees et al. | |

* cited by examiner

*Primary Examiner* — Rehana Perveen
*Assistant Examiner* — Loc Tran
(74) *Attorney, Agent, or Firm* — Mintz Levin Cohn Ferris Glovsky and Popeo, P.C.

(57) ABSTRACT

Creation of an index for a table of sorted data for use by a data storage application is initiated. Thereafter, N+1 logical partition of rows of the table are defined so that each logical partition has a corresponding worker process. Each worker process then builds a sub-index based on the corresponding logical partition which are later merged to form the index. Related apparatus, systems, techniques and articles are also described.

16 Claims, 2 Drawing Sheets

HIGH PERFORMANCE INDEX CREATION ON SORTED DATA USING PARALLEL QUERY PLANS

TECHNICAL FIELD

The subject matter described herein relates to parallelized creation of an index for sorted data for use by a data storage application.

BACKGROUND

Database indexes are data structures used to retrieve data stored in database tables. Through the use of indexes, desired data can be located without scanning through every row in a database table each time the table is accessed. Building an index on a table having sorted data rows on the index key column values involves reading the data rows, extracting the index key column values, and building the index rows. Indexes are conventionally generated using a serial query plan which means that a single process does all of the processing to construct the index.

SUMMARY

Creation of an index for a table of sorted data for use by a data storage application is initiated. Thereafter, N+1 logical partition of rows of the table are defined so that each logical partition has a corresponding worker process. Each worker process then builds a sub-index based on the corresponding logical partition which are later merged to form the index.

The logical partitions can be defined by collecting a sample from the data rows of the table with their corresponding row identifiers, and sorting the sampled data rows and saving every Nth row together with its row identifier as a partition boundary.

The sub-indexes can be built by creating a parallel execution query plan to be executed by N+1 worker processes and one coordinating worker process. The coordinating worker process can cause each sub-index to be merged to form the index. The parallel execution query plan can be executed, for example, by reading data rows from a beginning of the table by a worker process assigned to a first partition. A worker process reading data rows can compare index key values in each row to a corresponding value for a lower partition boundary row for the corresponding partition until a row identifier for a current row is larger than a row identifier for the lower partition boundary row to identify a first qualifying row for the partition. Each worker process after the first qualifying row for the corresponding partition can compare a row identifier for a current row to a row identifier of an upper partition boundary row. Each worker process can terminate scanning of the data rows when an index key value for the current row is larger than an index key value for the upper partition boundary row to complete the corresponding sub-index.

Non-transitory computer program products (i.e., physically embodied computer program products) are also described that store instructions, which when executed one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The subject matter described herein provides many advantages. For example, performance improvements with regard to processing time and consumption of resources are improved by partitioning index creation (as described herein) so that multiple processes can be each assigned a partition to scan and build sub-indexes which are later merged into the index by a single process. The current subject matter can provide further performance improvements when data rows upon which the index is being built are stored in compressed format because the work required to decompress the data rows to extract the index key values can be done in parallel. Furthermore, the current subject matter provides performance enhancements by parallelizing de-encryption of encrypted rows when building an index on a table with encrypted data.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
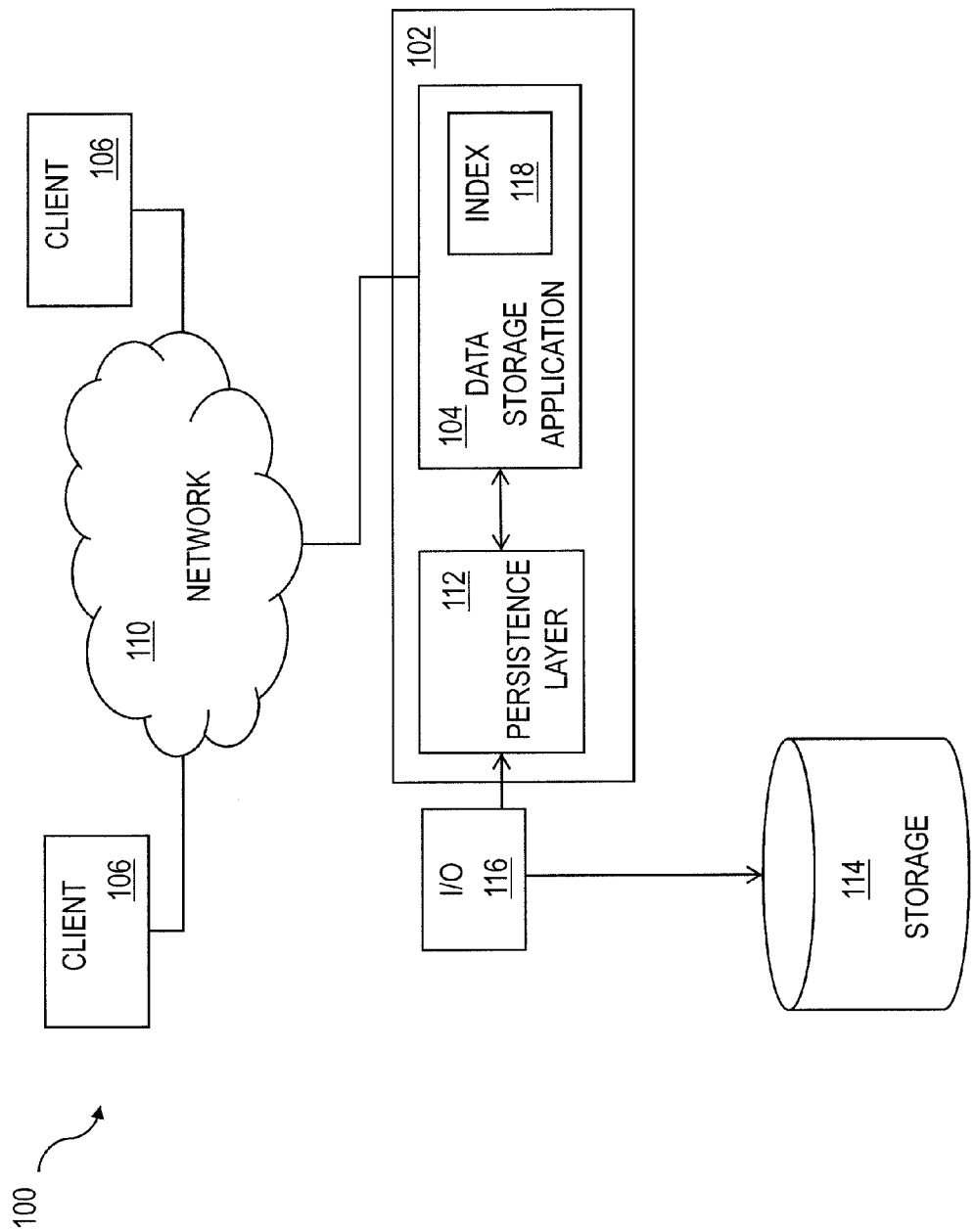
FIG. 1 is a system diagram showing an environment including a data storage application.

FIG. 1 shows an example of a system 100 in which a computing system 102, which in turn can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter. The data storage application 104 can include an index 118 that can be used to handle queries of the storage 114 originating from one of the clients 106.

Figure 2:
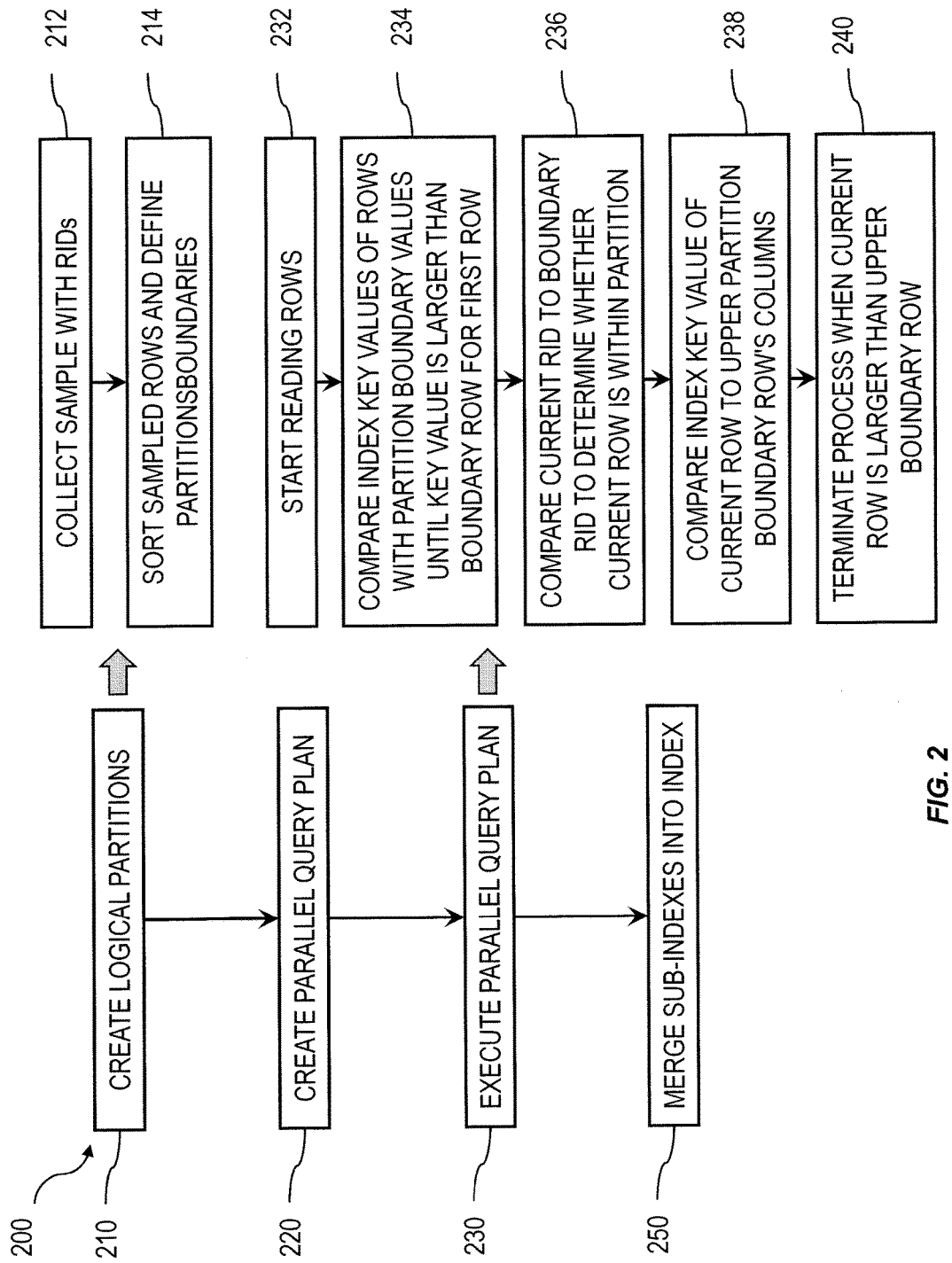
FIG. 2 is a process flow diagram illustrating creation of an index using parallel query plans.

In one variation, the storage 114 comprises sorted data for which the index 118 must be created. With reference to FIG. 2, the index can be generated by creating, at 210, logical partitions of the data rows upon which the index is to be built. One partition can be built for each worker process that will be creating the index in parallel. The partitions can be constructed by collecting, at 212, a sample from the data rows together with their row identifiers (RIDs), and sorting, at 214, the sampled rows and saving every Nth row (if N+1 partitions are required) together with its RID as a partition boundary. In some cases, adjustments can be made as needed to avoid duplicate boundary rows.

Subsequently, a parallel query plan is created, at 220, to be executed by N+1 worker process and 1 coordinating process.

Thereafter, at 230, a parallel query plan is executed. The parallel query plan can provide that each worker process is assigned rows in a single partition to process so that a sub-index can be built from those rows. This assignment can be implemented by having the worker process assigned to the first partition begin reading row identifiers from rows from the beginning of the table at 232 (with all other worker processes using the RID of their partition lower boundary row to position on that row as the first row to read).

As each process starts reading data rows, at 234, each process can compare the index key values in the row it reads (current row) to the corresponding values in the lower partition boundary row until it finds a row whose index key values are larger than the index key values of the lower partition boundary row. This is the first qualifying row that this worker process will use to build its sub-index. The process that is reading the first partition has no lower boundary row, so the first row it reads becomes its first qualifying row. In some variations, the rows can be read in sorted order by the processes building the sub-indexes.

For each current row after the first qualifying row, the process, at 236, can only compare the current row's RID to the RID of the upper boundary row to determine whether the current row is a member of its partition.

Once the current row's RID matches the upper partition boundary row's RID, the process, at 238, can stop comparing RIDs and compare the index key column values of the current row to the upper partition boundary row's columns.

When the current row is larger than the upper boundary row, the worker process, at 240, can terminate its scan of the data rows and can complete building the sub-index for its partition.

When the last worker process is finished creating its sub-index, a coordinator process (which oversees/coordinates all worker processes), at 250, can merge the sub-indexes into the final index (index 118).

As noted, the approaches described herein allow the work needed to create an index on sorted data to be done by multiple worker processes simultaneously. The elapsed time to completion of the index creation will be slightly more than the time it takes the longest running worker processes to complete building its sub-index; the extra time will be needed for the coordinator process to merge the sub-indexes into the final index.

The current approach scales with the number of worker processes, if the execution environment is sufficient. Stated differently, the more worker processes, the less work for each one and the more work that can be done in parallel, so the longest running process will be finished sooner and the index creation will complete sooner.

Sampling can be used to logically partition the data rows into ranges of values based upon the index key column values. Each range can be defined by an upper and a lower partition boundary row which is a data row that is obtained from the sample (exceptions are the first partition, which has no lower boundary and the last partition, which has no upper boundary). The partition boundary data rows can be stored together with their row identifiers (RIDs). By using these partition boundary data rows with their RIDs various advantages can be realized. In some cases, sampling can be used to make the partitions have a uniform/substantially uniform size.

First, the RIDs of the lower partition boundary rows are used to position the start of the table scan to read the data rows for each of the worker processes. The exception is the processes scanning the first partition—it has no lower boundary row and so starts at the beginning of the table. Using the lower boundary row's RIDs to position the start of the data row scan avoids having each worker process read the entire table to find the data rows it must process. In fact, each process would normally read only a few more data rows that it needs to process.

Second, because the lower partition boundary row is exclusive (only rows greater than this row belong in the partition), as a processes reads rows it must compare the index key column values of each row that it reads to the corresponding column values in the lower partition boundary row to determine whether the current row is a duplicate of the boundary row, and does not qualify for the current partition, or whether the row is greater than the boundary row and does qualify. Column value comparison may include decoding the position of the column value in the row buffer, decompressing the column value as well as executing complex multi-byte character comparison functions. With this approach, after the first qualifying row, only the RID of the subsequent rows needs to be compared to the RID of the data row that represents the upper partition boundary. This comparison involves a simple numeric comparison, avoiding the CPU cycles needed to find each index key column value in the row, decompress it and use complex comparison functions which would otherwise be needed for each row read. Once the RID of the current row matches the RID of the upper partition boundary row, the processing reverts to column-by-column comparison to find all data rows that have duplicate index key values to the upper partition boundary row—These are part of the current partition.

Third, reading of data rows is terminated when the first non-qualifying row after the row with the RID of the upper partition boundary row is read.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" (sometimes referred to as a computer program product) refers to physically embodied apparatus and/or device, such as for example magnetic discs, optical disks, memory, and Programmable Logic Devices (PLDs), used to provide machine instructions and/or data to a programmable data processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

What is claimed is:

1. A method for implementation by one or more data processors of at least one computing system comprising:

initiating creation of an index for a table of sorted data for use by a data storage application, the sorted data being sorted according to index key values in an index key column of the table;

partitioning the table into a plurality of logical partitions each comprising one or more rows of the table, a number of logical partitions in the plurality of logical partitions being equal to a number of worker processes in a plurality of worker processes, each logical partition of the plurality of logical partitions having a corresponding worker process of the plurality of worker processes, each logical partition being a range of values defined by an upper partition boundary and a lower partition boundary, the partitioning comprising collecting a sample from the table and determining, based on the sample, a row identifier for the lower partition boundary and a row identifier for the upper partition boundary for each partition of the plurality of partitions, and an upper partition boundary of a first logical partition of the plurality of partitions being a lower partition boundary of a second logical partition of the plurality of partitions; and building, by each of the plurality of worker processes, a sub-index based on the logical partition to which that worker process corresponds, the building of the sub-index by each of the plurality of worker processes resulting in a plurality of sub-indexes with one sub-index of the plurality of sub-indexes being based on each of the plurality of logical partitions, and the building of the sub-index comprising:

initiating a scan of the table at a row having a row identifier that matches a row identifier of the lower partition boundary;

identifying a first row that qualifies for inclusion in the sub-index by at least performing a comparison to an index key value of the lower partition boundary, the first row qualifying for inclusion in the sub-index based at least on an index key value of the first row being greater than the index key value of the lower partition boundary;

in response to identifying the first row, identifying a second row that qualifies for inclusion in the sub-index by at least performing a comparison to a row identifier of the upper partition boundary, the second row qualifying for inclusion in the sub-index based at least on a row identifier of the second row being less than and/or equal to the row identifier of the upper partition boundary;

in response to identifying the second row, identifying a third row that qualifies for inclusion in the sub-index by at least performing a comparison to an index key value of the upper partition boundary, the third row qualifying for inclusion in the sub-index based on an index key value of the third row matching the index key value of the upper partition boundary; and in response to identifying the third row, terminating the building of the sub-index based at least on an index key value of a fourth row being greater than the index key value of the upper partition boundary; and merging the plurality of sub-indexes to form the index.

2. A method as in claim 1, wherein the building comprises: creating a parallel execution query plan to be executed by the number of worker processes and one coordinating worker process.

3. A method as in claim 2, wherein the coordinating worker process causes the merging of the plurality of sub-indexes to form the index.

4. A method as in claim 2, wherein the building further comprises: executing the parallel execution query plan.

5. A method as in claim 4, wherein the executing comprises: reading data rows from a beginning of the table by a worker process assigned to a first partition of the plurality of partitions.

6. A method as in claim 1, wherein at least one of the initiating of the creation of the index, the partitioning of the table, the building of the sub-index, and the merging of the plurality of sub-indexes is implemented by at least one data processor.

7. A non-transitory computer program product storing instructions which when executed by at least one data processor of at least one computing system result in operations comprising:

initiating creation of an index for a table of sorted data for use by a data storage application, the sorted data being sorted according to index key values in an index key column of the table;

partitioning the table into a plurality of logical partitions each comprising one or more rows of the table, a number of logical partitions in the plurality of logical partitions being equal to a number of worker processes in a plurality of worker processes, each logical partition of the plurality of logical partitions having a corresponding worker process of the plurality of worker processes, each logical partition being a range of values defined by an upper partition boundary and a lower partition boundary, the partitioning comprising collecting a sample from the table and determining, based on the sample, a row identifier for the lower partition boundary and a row identifier for the upper partition boundary for each partition of the plurality of partitions, and an upper partition boundary of a first logical partition of the plurality of partitions being a lower partition boundary of a second logical partition of the plurality of partitions; and building, by each of the plurality of worker processes, a sub-index based on the logical partition to which that worker process corresponds, the building of the sub-index by each of the plurality of worker processes resulting in a plurality of sub-indexes with one sub-index of the plurality of sub-indexes being based on each of the plurality of logical partitions, and the building of the sub-index comprising:

initiating a scan of the table at a row having a row identifier that matches a row identifier of the lower partition boundary;

identifying a first row that qualifies for inclusion in the sub-index by at least performing a comparison to an index key value of the lower partition boundary, the first row qualifying for inclusion in the sub-index based at least on an index key value of the first row being greater than the index key value of the lower partition boundary;

in response to identifying the first row, identifying a second row that qualifies for inclusion in the sub-index by at least performing a comparison to a row identifier of the upper partition boundary, the second row qualifying for inclusion in the sub-index based at least on a row identifier of the second row being less than and/or equal to the row identifier of the upper partition boundary;

in response to identifying the second row, identifying a third row that qualifies for inclusion in the sub-index by at least performing a comparison to an index key value of the upper partition boundary, the third row qualifying for inclusion in the sub-index based on an index key value of the third row matching the index key value of the upper partition boundary; and in response to identifying the third row, terminating the building of the sub-index based at least on an index key value of a fourth row being greater than the index key value of the upper partition boundary; and merging the plurality of sub-indexes to form the index.

8. A non-transitory computer program product as in claim 7, wherein the building comprises: creating a parallel execution query plan to be executed by the number of worker processes and one coordinating worker process.

9. A non-transitory computer program product as in claim 8, wherein the coordinating worker process causes the merging of the plurality of sub-indexes to form the index.

10. A non-transitory computer program product as in claim 8, wherein the building further comprises: executing the parallel execution query plan.

11. A non-transitory computer program product as in claim 10, wherein the executing comprises: reading data rows from a beginning of the table by a worker process assigned to a first partition of the plurality of partitions.

12. A system comprising:

at least one data processor; and memory storing instructions which when executed by the at least one data processor result in operations comprising:

initiating creation of an index for a table of sorted data for use by a data storage application, the sorted data being sorted according to index key values in an index key column of the table;

partitioning the table into a plurality of logical partitions each comprising one or more rows of the table, a number of logical partitions in the plurality of logical partitions being equal to a number of worker processes in a plurality of worker processes, each logical partition of the plurality of logical processes having a corresponding worker process of the plurality of worker processes, each logical partition being a range of values defined by an upper partition boundary and a lower partition boundary, and the partitioning comprising collecting a sample from the table and determining, based on the sample, a row identifier for the lower partition boundary and a row identifier for the upper partition boundary for each partition of the plurality of partitions;

scanning each partition of the plurality of partitions by the partition's corresponding worker process, the scanning of each partition beginning at the lower partition boundary in the sample for its corresponding partition and without the worker process needing to scan the table to find the lower partition boundary;

building, by each of the plurality of worker processes, a sub-index based on the logical partition to which that worker process corresponds, the building of the sub-index by each of the plurality of worker processes resulting in a plurality of sub-indexes with one sub-index of the plurality of sub-indexes being based on each of the plurality of logical partitions, and the building of the sub-index comprising:

initiate a scan of the table at a row having a row identifier that matches a row identifier of the lower partition boundary;

identifying a first row that qualifies for inclusion in the sub-index by at least performing a comparison to an index key value of the lower partition boundary, the first row qualifying for inclusion in the sub-index based at least on an index key value of the first row being greater than the index key value of the lower partition boundary;

in response to identifying the first row, identifying a second row that qualifies for inclusion in the sub-index by at least performing a comparison to a row identifier of the upper partition boundary, the second row qualifying for inclusion in the sub-index based at least on a row identifier of the second row being less than and/or equal to the row identifier of the upper partition boundary;

in response to identifying the second row, identifying a third row that qualifies for inclusion in the sub-index by at least performing a comparison to an index key value of the upper partition boundary, the third row qualifying for inclusion in the sub-index based on an index key value of the third row matching the index key value of the upper partition boundary; and in response to identifying the third row, terminating the building of the sub-index based at least on an index key value of a fourth row being greater than the index key value of the upper partition boundary; and merging the plurality of sub-indexes to form the index.

13. A system as in claim 12, wherein the building comprises: creating a parallel execution query plan to be executed by the number of worker processes and one coordinating worker process.

14. A system as in claim 13, wherein the coordinating worker process causes the merging of the plurality of sub-indexes to form the index.

15. A system as in claim 13, wherein the building further comprises: executing the parallel execution query plan.

16. A system as in claim 15, wherein the executing comprises: reading data rows from a beginning of the table by a worker process assigned to a first partition of the plurality of partitions.

\* \* \* \* \*